US005181069A

United States Patent [19]

Oleksinski et al.

[11] Patent Number: 5,181,069

[45] Date of Patent: Jan. 19, 1993

[54] METHOD AND APPARATUS FOR REWIRING CORONA WIRE CARTRIDGE

[75] Inventors: John A. Oleksinski, Libertyville; Earl D. Hedberg, Gurnee, both of Ill.

[73] Assignee: Station Eight, Inc., Waukegan, Ill.

[21] Appl. No.: 759,614

[22] Filed: Sep. 16, 1991

Related U.S. Application Data

[63] Continuation-in-part of Ser. No. 555,904, Jul. 23, 1990, Pat. No. 5,140,367.

[51] Int. Cl.[5] .............................................. G03B 00/00

[52] U.S. Cl. ..................................................... 355/133

[58] Field of Search ............... 355/221, 133, 219, 222; 250/324, 325; 360/229, 225, 230, 212, 214

[56] References Cited

U.S. PATENT DOCUMENTS 3,499,143 5/1968 Martin ................................ 250/324
4,320,957 3/1982 Brown et al. ....................... 355/221
4,626,701 12/1986 Onoda et al. ....................... 355/221
4,754,305 6/1988 Fantuzzo et al. ................... 250/325
4,864,363 9/1989 Shinada .............................. 355/133
4,914,480 4/1990 Endo ................................. 355/221

*Primary Examiner*—Michael L. Gellner
*Assistant Examiner*—D. Rutledge
*Attorney, Agent, or Firm*—James N. Videbeck

[57] ABSTRACT

A method and apparatus for fitting a replacement corona wire onto a corona wire cartridge is disclosed wherein the assembly includes a pair of hook type terminals, rivets to mount those terminals onto a cartridge frame, a replacement corona wire having a loop at each end, with one loop through one hook terminal and the opposing loop through one end of a double hook ended coil spring. The opposing coil spring hook end is mounted on the opposing hook end terminal.

3 Claims, 3 Drawing Sheets

10
11
12
13
14
15
16
18
20
21
22
23
45
46
47
48
50
55
56
57

METHOD AND APPARATUS FOR REWIRING CORONA WIRE CARTRIDGE

This application is a continuation-in-part of application Ser. No. 555,904, filed Jul. 23, 1990, now U.S. Pat. No. 5,140,367.

BACKGROUND OF THE INVENTION

This invention relates to corona wire cartridges of the type used on photocopiers, laser printers and the like, and more particularly, to a method and apparatus for replacing a worn or broken corona wire on such cartridges while utilizing the original equipment cartridge framework.

Existing corona wire cartridges are disclosed at U.S. Pat. Nos. 4,626,701; 3,499,143; 4,754,305; and 4,864,363. The "701" patent discloses a corona wire cartridge sold under the trademark Canon wherein the corona wire is suspended across an elongate opening in the cartridge and permanently mounted on the opposing ends of the cartridge by rivets. Tension is placed on the corona wire by means of a pair of rollers also mounted on each end of the cartridge which press on the corona wire when installed. The "363" patent discloses a corona wire cartridge sold under the trademark Ricoh, wherein the cartridge includes a post-type mounting and the corona wire includes a metal eyelet at one end which is mounted on one post, and a coil tension spring mounted on the opposing post. A loop end of the coil spring is a retainer for an opposing looped end of the corona wire.

At the present time, maintenance persons in the field, by and large, replace entire corona wire cartridges when the wire ceases to function properly, that is, when it is corroded or breaks. As an alternative to replacing an entire corona wire cartridge, maintenance repair people have been supplied with coils of tungsten wire which, if they desire and have the sufficient technical knowledge and ability, may be cut to proper lengths and hand fitted to old cartridges. To date, hand made corona wire replacements made from long coils of tungsten wires have, in the main, proven not as satisfactory as replacing the entire corona wire cartridge.

A need has developed for pre-made individual replacement corona wires, and apparatus for mounting those corona wires to existing corona wire cartridges so as to save the expense of purchasing an entire replacement corona wire cartridge while at the same time providing a replacement unit which provides the quality of operation of an original corona wire cartridge assembly.

It is therefore an object of the present invention, generally stated, to provide an improved means for rewiring a corona wire cartridge by providing apparatus for modifying present cartridge to accept the new pre-made corona wire assembly, and by providing an improved method of retrofitting corona wire cartridges with the new replacement wire assembly.

SUMMARY OF THE INVENTION

The invention is found in a corona wire cartridge adapted for enabling printed matter to be fixed on sheet material of the type including a generally rectangular frame having opposed end portions and a hollow interior portion. A pair of corona wire mountings are positioned on each opposed end portion and a corona wire is mounted therebetween. The invention is directed to a replacement wire assembly for the corona wire cartridge and includes a corona wire of predetermined length having a loop at each of its opposed ends. One of the corona wire loops is retainingly engaged on one of the corona wire mountings. A coil spring includes a loop or hook at each end with one of those loops or hooks retainingly engaging one of the corona wire end loops. The other of the coil spring loops or hooks engages the other one of the corona wire mountings.

BRIEF DESCRIPTION OF THE DRAWINGS

The features of the present invention which are believed to be novel are set forth with particularity in the appended claims. The invention, together with further objects and advantages thereof, may best be understood by reference to the following detailed description taken in conjunction with the accompanying sheets of drawings, in the several features of which like reference numerals identify like elements, and in which:

DETAILED DESCRIPTION OF PREFERRED EMBODIMENTS

Figures 1, 2, 3, 4:
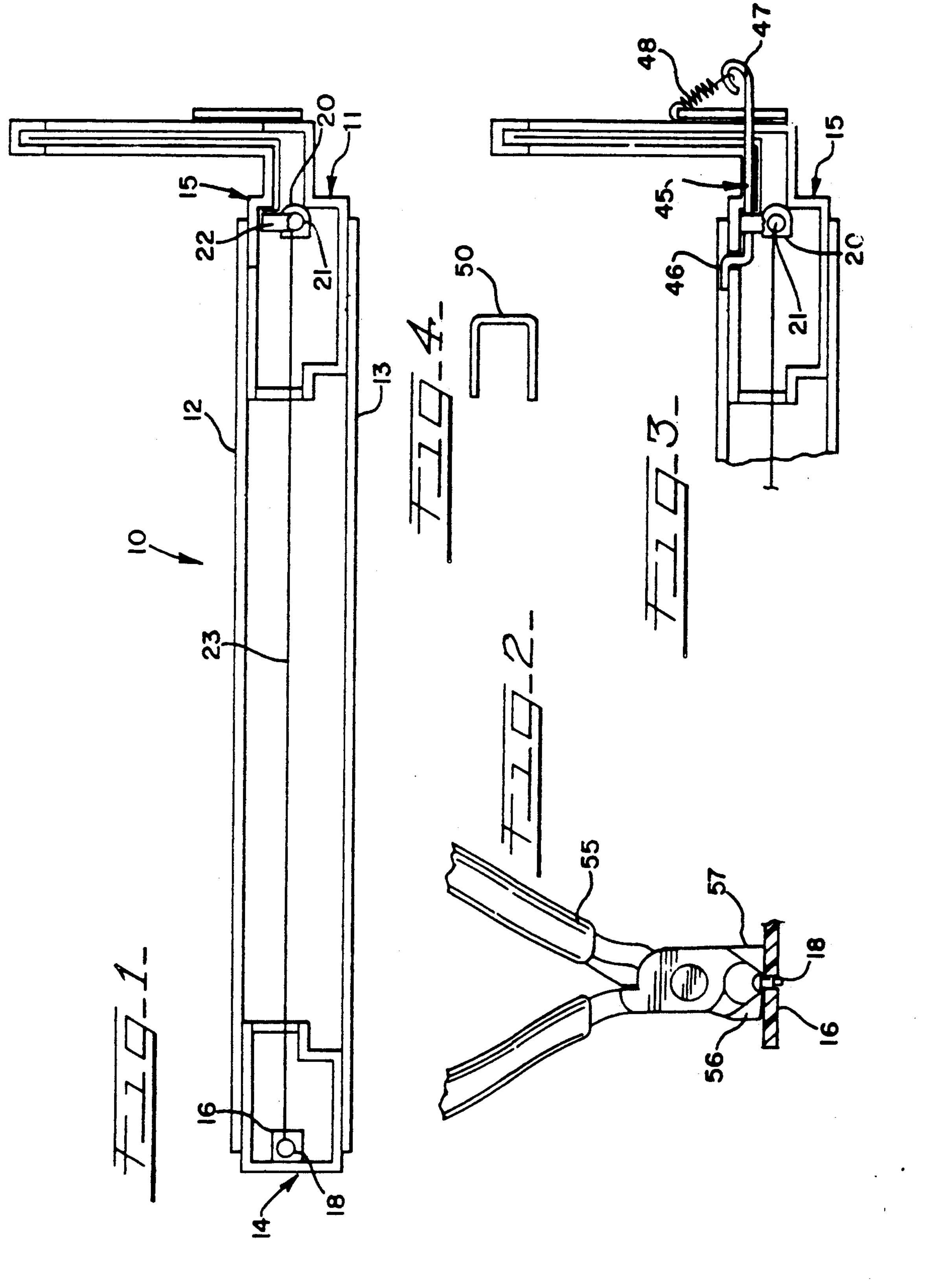
FIG. 1 is a bottom plan view of a Canon SX type corona wire cartridge as shown with its roller mountings removed disclosing the permanently mounted original equipment corona wire therein.
FIG. 2 is a fragmentary detailed view showing the removal of one of the permanent rivets shown in the cartridge of FIG. 1.
FIG. 3 is a fragmentary detailed view of one end of the corona wire cartridge of FIG. 1 showing a retaining clamp in position to bias an electrical contact away from the other of the corona wire permanent rivet mountings.
FIG. 4 is a top plan view of an alternate embodiment of the retaining clamp which is used for biasing electrical contacts in Canon type CX corona wire cartridges.

Referring to FIGS. 1 and 2, a corona wire cartridge such as sold under the trademark Canon and model designation SX is shown at 10 and includes a frame 11 having a pair of elongate parallel, spaced frame rails 12, 13, and opposed end mountings 14, 15 which are positioned between the frame rails 12, 13 to define an elongate hollow interior of said cartridge 10.

Left end mounting 14 includes a boss or solid block 16 having a hole 17 therein in which a rivet 18 is forceably retained. Likewise right end mounting 15 includes a boss or solid block 20 having a hole therein (not shown) in which a rivet 21 is forceably retained. Right side end mounting 15 also includes an electrically conducting contact spring 22 which may be biased against the top of rivet 21 or, in some cases not shown, retained between the head of the rivet and block 20. An original equipment corona wire 23 is forceably retained between each rivet and its mounting boss so as to extend across the middle of the hollow area parallel to and in between the frame rails 12, 13.

Figure 5:
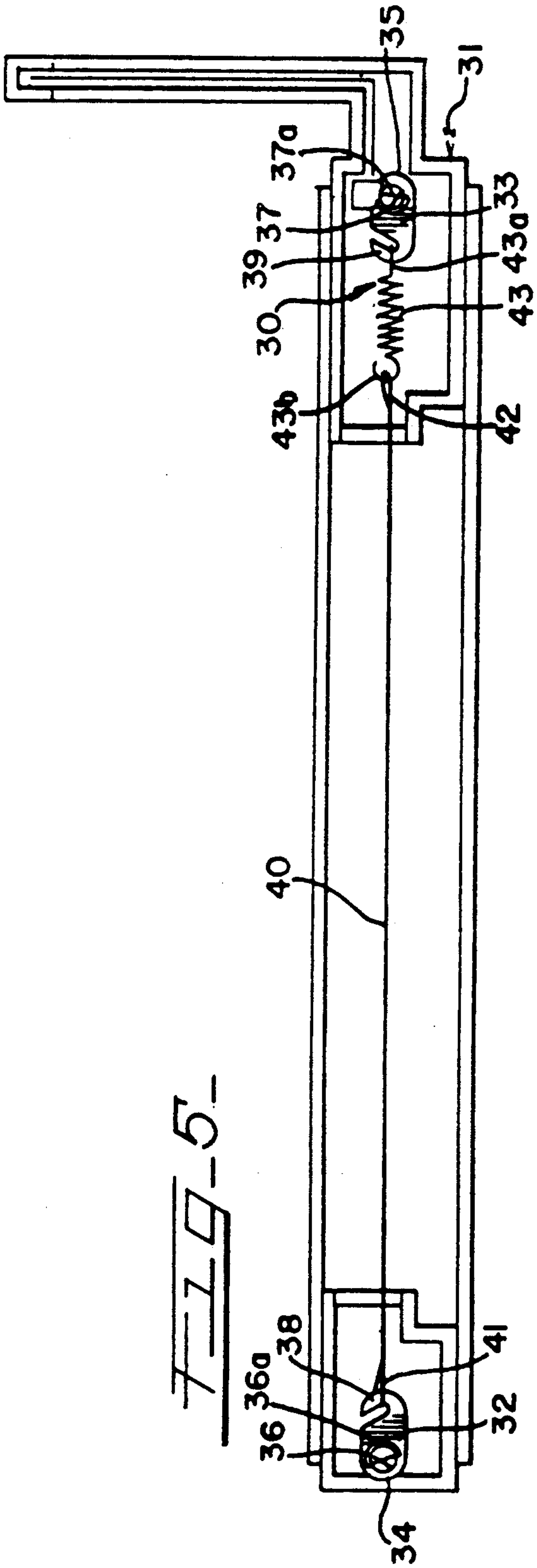
FIG. 5 is a bottom plan view of the Canon type SX corona wire cartridge which has been retrofitted with a corona wire assembly constructed in accordance with the present invention.

Referring to FIG. 5, a first embodiment of a corona wire retrofit assembly, generally indicated at 30, is shown mounted in a Canon SX cartridge frame 31 which is identical to the frame 11 of FIG. 1. The first embodiment of a retrofit assembly 30 includes opposed terminals 32, 33, each having a base end 34, 35, respectively, an aperture 36, 37, respectively, through which rivets 36*a*, 37*a*, respectively, are retained. Each terminal 32, 33 further includes a hook end 38, 39, respectively.

A replacement corona wire 40 of pre-determined length is made of tungsten and includes a large loop 41 at one end, and a smaller loop 42 at the opposing end. A first coil spring 43 includes opposed hook ends 43*a*, 43*b*.

Figure 7:
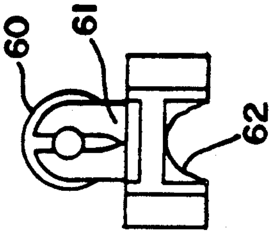
FIG. 7 is an end elevational view of the corona wire cartridge and roller assembly shown in FIG. 6, which has been modified to clear the tension spring shown on the right hand corona wire mounting in FIG. 5.
Figure 6:
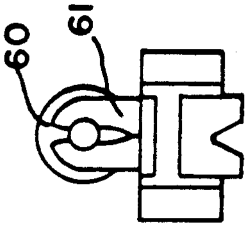
FIG. 6 is a end elevational view of a roller mounting for the Canon type corona wire cartridge as it appears in its original condition.
Figure 8:
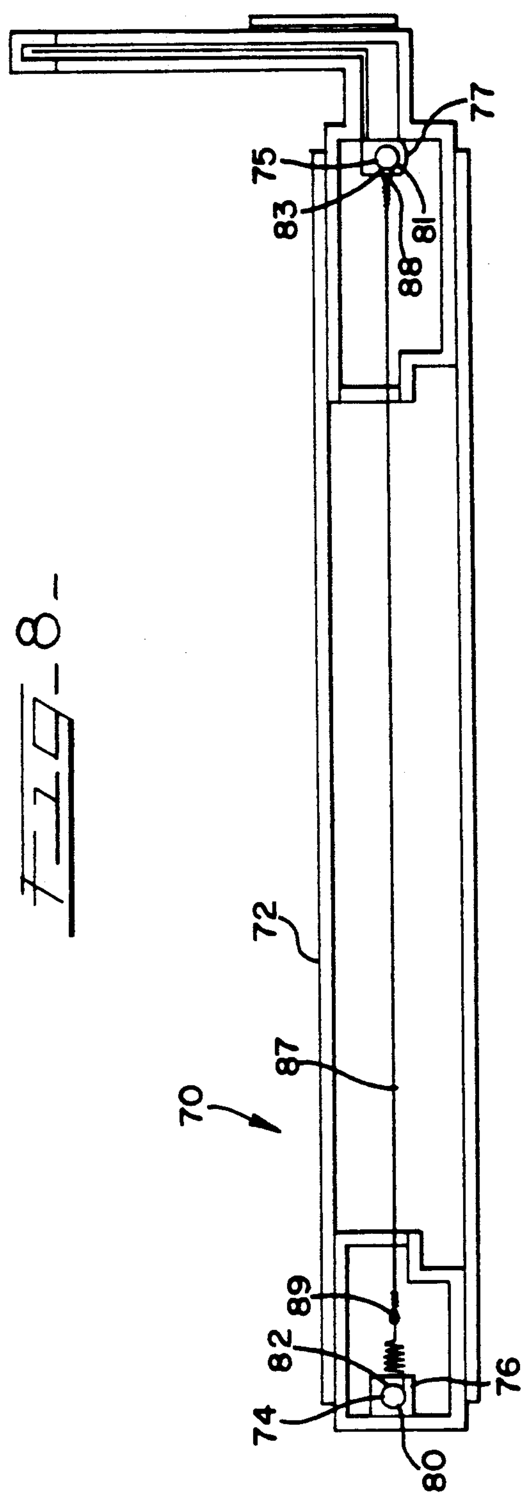
FIG. 8 is a bottom plan view of a Canon SX type corona wire fitted with a replacement corona wire in accordance with a second embodiment of the invention.
Figure 9:
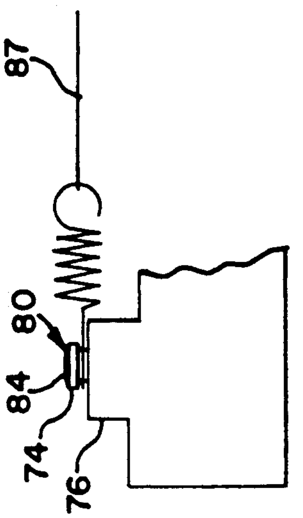
FIG. 9 is a fragmentary enlargement showing the corona wire and spring as provided in accordance with the second embodiment.

Referring to FIGS. 3 and 4, an elongate retaining wire 45 suitable for biasing the contact spring 22 clear of rivet 21 (FIG. 1) includes an offset end 46 and an opposing loop end 47 from which a second coil spring 48 extends to retain that end against right end mounting 15. A U-shaped spring 50 may be utilized to bias a similar contact spring in a CX type cartridge. The invention further includes a nipper pliers 55 (FIG. 2) which has the opposed outer surfaces of jaws 56, 57 nose end pieces trimmed flat as shown to enable the pliers to lift rivets from their mountings as shown in FIG. 2. Additionally, a pair of household pliers (not shown) may be utilized to press the replacement rivets in their bosses, and it is preferred that the household pliers have their distal interior teeth ground to prevent damage to the cartridge, rivets and contacts. Glue should be used to permanently secure the rivet in the boss. Tweezers (not shown) help place the rivets and terminals on the bosses, and a conventional elongate spring puller (not shown) with a 90° bent tip can be utilized to hook the coil spring 43 onto the contact side terminal 33. Referring to FIGS. 6 and 7 a hole punch (not shown) or cutting pliers such a pliers 55 may be utilized in connection with roller 60 and roller mounting 61 to cut out the bottom portion thereof as shown at 62 in FIG. 7 so the right side roller clears coil spring 43. Cotton swabs (not shown) dipped in anhydrous alcohol are used to clean the new corona wire 40.

A second embodiment of the invention is shown in FIG. 8 to FIG. 11 in which a corona wire retrofit assembly is indicated as 70, again mounted in a Canon SX cartridge frame 72 have opposing terminals which are in the form of rivets, one at each end 76, 77. The original rivets have been removed using the process previously described, and replacement rivets 80, 81 have been inserted into each of the apertures 82, 83 from which the original rivets have been removed respectively.

Figure 10:
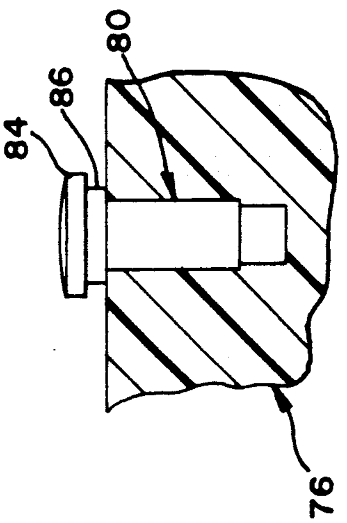
FIG. 10 is a cross-sectional view of one of the end mountings fitted with a replacement rivet in accordance with the second embodiment of the invention.
Figure 11:
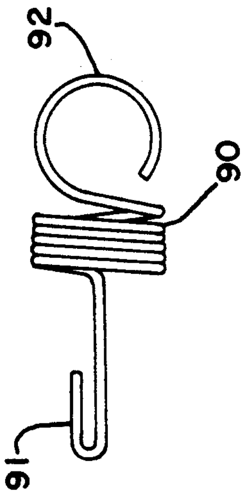
FIG. 11 is a side elevational view of a spring provided in accordance with the second embodiment of the invention.

Referring to FIG. 10, the head 84 of the replacement rivets, in this case No. 80, have an outer ridge 85 below which there is an annular facia 86, such that when the replacement rivets 80, 81 are inserted into the apertures 82, 83 the facia 86 is capable of retaining an end loop of a corona wire 87 under the outer ridge 85 of the head 84. As with the first embodiment, the wire 87 has a larger loop 88 at one end and a smaller loop 89 at the other end. In addition to the wire 87 and the rivets 80, 81, the invention includes a spring 90 one end of which has an extended hook 91 and the other end of which has a tighter hook 92.

In this embodiment, the rivets 80, 81 are inserted into the respective apertures 82, 83 as was done in the first embodiment. Care must be taken not to force the rivets 80, 81 so deep into the apertures 82, 83 so as to cause the facia 86 of the head 84 to enter the plastic. Using the tweezers, place the larger loop 88 of the wire 87 over the head 84 of one of the rivets 81, insert the tighter hoop 92 of the spring 90 in to the smaller loop 89, and fit the extended hook 91 of the spring 90 around the facia 86 of the second rivet 80.

The first step to retrofitting the CX or SX engine cartridge 10 for either embodiment of the invention is to remove the rivets 18, 21 at both ends. In these permanent corona installations the corona wire 23 is being held in place between the shank of the rivets and the inner walls of the aperture in which the rivets are fitted. On one end 14 the rivet 18 is open and not obstructed by anything and can be easily removed. The rivet 21 on the other end 15 has some type of contact spring 22 that fits under the rivet head, on one variation (not shown) or sets on top of the rivet 21. Removal of the open or unobstructed rivet is accomplished as shown in FIG. 2, by positioning the modified nipper pliers 35 so that the head of the rivet 18 is between the jaws 56, 57. The flat outer surfaces of jaws 56, 57, on pliers 55 should be resting on the plastic 16. Squeeze the pliers 55 and press down to get the jaws leading edge under the rivet head 18 then pull the rivet out.

To retrofit the cartridge using the first embodiment, get a terminal 32 and a new rivet 36*a*, and using the pair of tweezers place the shank of the rivet 36*a* into the small terminal aperture 36. Put the terminal rivet assembly aside for a minute. Using a glue that is compatible with plastic and metal place a drop of glue into the boss hole. The glue hardening speed should be between 15 and 30 seconds. Next pick up the terminal rivet assembly 32, 36*a* with the tweezers. Hold the rivet 36*a* with the tweezers and position the rivet shank into the hole containing glue. The fit may be tight and require a conventional household pliers (not shown) modified as described above to clamp and force on the new rivet 36*a*. The next step is to align the terminal 32 along a central axis of the cartridge before the glue hardens. While aligning the terminal, bend the hook end down approximately 10 to 15 degrees (into the paper as shown in FIG. 5). Bending the terminal 32 will significantly reduce the shearing action between the corona wire 40 and the terminal 32 caused by the tension roller 60.

To fit the cartridge using the second embodiment new rivets 80, 81 are inserted using tweezers, glue and household pliers are used as was done with the first embodiment, taking care not to exert too much force on the rivet as previously stated.

REMOVAL OF THE OBSTRUCTED RIVET

The CX cartridge (not shown) has an obstructing contact spring that sets above the rivet head. On the SX cartridge 10 there are two variations of the contact spring. One type 22 sets over the rivet head and the other (not shown) fits under the rivet head. On the CX cartridge a U-shaped spring 50 is installed so that it holds the contact spring in a position that no longer obstructs the rivet head. On the SX cartridge, a retaining wire 45 with a coil spring 48 is used to position the contact spring 22 away from the rivet head 21. When the contact spring is under the head, the rivet is removed normally. The terminal assembly 33, 37*a* is then placed in position and aligned on the SX cartridge 10 where the contact spring is under the rivet head. Be careful not to get glue on the upper side of the spring 21. When the terminal alignment is completed and the hook end bent down 10–15 degrees, the spring retainers can be removed. You are now ready to install a new replacement corona wire.

INSTALLING THE CORONA WIRE

The corona wire 40 or 87 has a loop at each end 41, 42 or 88, 89, respectively. One loop 41 or 88 is larger than the other 42 or 89 respectively. For the first embodiment, next place the larger loop end 41 onto the non-contact terminal hook 38. Then, attach the coil spring 43 to the smaller loop 42 and, with a conventional spring puller tool (not shown), stretch the coil spring 43 and hook it onto the contact side terminal 33. For the second embodiment, place the larger loop 88 of the wire 87 over the head 84*a* of one of the rivets 81. Insert the tight hook 92 of the spring 90 in the smaller loop 89. Finally, using the tweezers to stretch the spring 90 hook the extended hook 91 over the head 84 of the second rivet 80 such that it seats around the facia 86.

CLEANING THE CORONA WIRE

For the corona wire 40, 87 to function properly, all fingerprints and contaminants must be removed. When replacing the corona wire 40, 87 try not to touch the wire surface. If possible touch only the loop ends. As a precautionary measure clean the corona wire after installation. Cotton balls or cotton swabs dipped in anhydrous alcohol will do. When cleaning the corona wire 40, 87 wipe the wire in one direction only. Fingerprints on the corona wire may cause black or white lines on the copies.

TENSION ROLLER

The cartridge is now ready to be installed. However, in the first embodiment, the tension roller assembly 60, 61 used on the contact spring side needs the area that goes over the coil spring 43 opened up before installing. This can be accomplished by using some type of cutter pliers 55 or a common hole punch (not shown) to cut out the area under the roller so that it will clear the coil spring. This is best done by making small cuts and using a trim knife when using pliers 55.

A preferred assembly and method of retrofitting a corona wire on a corona wire cartridge for a Canon SX type cartridge has been shown and described. However, as noted the procedure can also be utilized on Canon CX cartridges utilizing U-shaped spring 50. The above method may also be utilized on corona wire cartridges originally made by other manufacturers within the scope of the present invention. It should also be noted that the assemblies originally disclosed as retrofit pieces can also be utilized as original equipment on new printers, copy machines or the like.

While the present invention has been described in connection with those particular embodiments thereof, it will be understood by those in the art that many changes may be made without departing from the true spirit and scope of the present invention. Therefore, it is intended by the appended claims to cover all such changes and modifications which come within the true spirit and scope of this invention.

The invention is claimed as follows:

1. A method for replacing a corona wire in a corona wire cartridge of the type including a generally rectangular frame having opposed end portions, a hollow interior portion, and a pair of corona wire mountings with one mounting adjacent each end portion, and a rivet positioned on each mounting said method comprising the steps of removing an unobstructed one of said rivets from its mounting;

biasing an electric contact from a position obstructing the other of said rivets from its mounting;

removing the obstructed rivet from its mounting;

removing the original corona wire;

attaching a replacement rivet having an outer ridge and an inner recess thereunder on each of said corona wire mountings;

unbiasing said electrical contact;

hooking a coil spring onto a first loop end of a replacement corona wire;

engaging a second loop end of said replacement corona wire over said ridge and on said recess of one of said rivets;

pulling the coil spring until it engages the other of said rivets on said recess thereof.

2. A method for replacing a corona wire in a corona wire cartridge of the type including a generally rectangular frame having opposed end portions, a hollow interior portion and a pair of wire mountings with one mounting adjacent each end portion, and a rivet positioned on said mounting, said method comprising the steps of:

removing the original corona wire, removing each of said rivets from its mounting, inserting replacement rivets into said mounting, said replacement rivets having a head with an outer ridge below which is an inner recess, and hooking one end of a coil spring into a first loop end of a replacement corona wire, hooking a second end of said coil spring around said recess of one of said replacement rivets, engaging a second loop end of said replacement corona wire around said recess of said head of the other of said rivets.

3. In a corona wire cartridge for use in a printer copy machine or the like, said cartridge being of the type including an elongate generally rectangular frame having opposed end portions and a hollow interior portion, a pair of corona wire mountings having a mounting hole therein with one of said wire mountings adjacent each opposed end portion, a replaceable wire assembly comprising:

a rivet retained in each of said holes, each of said rivets having a head, said head of each of said rivets having an outer ridge and an inner recess under said outer ridge, a corona wire of pre-determined length including a wire loop at each of the opposed ends thereof, with one of said wire loops for being retainingly engaged on said recess in said head of one of said rivets;

a coil spring including a spring loop at each of two opposed ends thereof with one of said spring loops retainingly engaging one of said wire loops, and the other of said spring loops engaging a recess on the other of said rivets.

* * * * *